United States Patent [19]

Strauch

[11] Patent Number: 5,016,016

[45] Date of Patent: May 14, 1991

[54] VOLUME-SCATTERED ECHO DISCRIMINATION DEVICE FOR FM/CW RANGE MEASURING RADAR AND USE IN A RADIO ALTIMETER

[75] Inventor: Raymond Strauch, Viroflay, France

[73] Assignee: U.S. Philips Corporation, New York, N.Y.

[21] Appl. No.: 509,260

[22] Filed: Apr. 13, 1990

[30] Foreign Application Priority Data

Apr. 21, 1989 [FR] France ................................. 89 05336

[51] Int. Cl.$^5$ ............................................ G01S 13/34
[52] U.S. Cl. ........................................ 342/87; 342/122
[58] Field of Search ............... 342/87, 122, 128, 159, 342/26

[56] References Cited

U.S. PATENT DOCUMENTS

| | | | |
|---|---|---|---|
| 3,588,899 | 6/1971 | Strauch | 342/87 |
| 3,965,428 | 6/1976 | Katz et al. | 342/159 X |
| 4,024,541 | 5/1977 | Albanese et al. | 342/159 X |
| 4,200,871 | 4/1980 | Roeder et al. | 342/78 |
| 4,728,952 | 3/1988 | Residois | 342/26 |
| 4,739,327 | 4/1988 | König et al. | 342/26 |
| 4,881,077 | 11/1989 | Jehle et al. | 342/26 |

*Primary Examiner*—Gilberto Barró, Jr.
*Attorney, Agent, or Firm*—Robert J. Kraus

[57] ABSTRACT

The device comprises, in a control loop of the subtractive beat frequency fb between transmitted waves and waves received as an echo, a pursuit discriminator (11) establishing the frequency fb at f₀ and a pursuit validation circuit (12). This device is characterized by the combination of a contrast discrimination set (CDS (15 to 18) and a VSE discrimination set (21 to 25) for detecting energy in a guard band situated at the upper end of the frequency bands of the CDS, the latter comprising a contrast discriminator (15), a first attenuator (16) and controlling the pursuit validation circuit (12). The VSE discrimination set is arranged for controlling the gain of the first attenuator (16).

5 Claims, 2 Drawing Sheets

VOLUME-SCATTERED ECHO DISCRIMINATION DEVICE FOR FM/CW RANGE MEASURING RADAR AND USE IN A RADIO ALTIMETER

BACKGROUND OF THE INVENTION

The invention relates to a discriminating device for linearly frequency modulated continuous wave range measuring radar having an FM/CW sawtooth frequency comprising, in a control loop of the frequency fb of the subtractive beat signal Fb between transmitted waves and waves received by way of echoes, a pursuit discriminator for maintaining the frequency fb at a fixed value $f_0$, and including a pursuit validation circuit.

The invention particularly applies to radio altimeters on board aircraft or to proximity fuses for missiles. When applied to radio altimeters it intends to avoid the latter undesirably locking on to echoes from rain or hail and providing faulty altitude indications.

As regards the proximity fuses, the recognition of a Volume-Scattered Echo (VSE in the sequel of the text) allows of inhibiting the operation of the fuses in the case of rain, hail or particles and thus avoiding undesired triggerings.

Irrespective of their type of modulation, pulse or FM/CW modulation, the radars can detect scattered, volume-distributed echoes and this can be performed more easily according as the wavelength used is shorter. This property is advantageously used in meteorological radars to detect stormy precipitation. In other types of radar such as, for example, aircraft radio altimeters, the detection of precipitation located between the aircraft and the ground forms a serious drawback. One alleviates this drawback mainly by using sufficiently large wavelengths, for example: $\lambda=7$ cm for the radio altimeters instead of: $\lambda=2$ cm for the meteorological radars. However, aircraft automation which has become more and more advanced particularly during the take-off phase, requires an enhanced protection against faulty indications, even brief indications, which may be caused by an undesired locking on to heavy precipitation by the radio altimeter, which does not occur very frequency though, but it not exceptional.

More particularly, French Patent Specification No. FR-A 1.557.670, corresponding to U.S. Pat. No. 3,588,899 is known to provide a radio altimeter of the type defined in the opening paragraph having internal control elements, specifically an element termed contrast discriminator, for controlling the power and the form of the frequency spectrum of the beat signal on either one of the two sides of the reference frequency $f_0$, for example, equal to 25 kHz. In an FM/CW linear slope radar system the spectrum of the beat frequency, after reflection of the wave by a flat undefined scattering ground $W_S(f)$, has non-symmetrical shape with a maximum amplitude for a minimum frequency fmin and $W_S(f)$ then strongly diminishes to a value denoted fmax so that:

$$fmax = fmin/\cos \theta$$

with hypothesis of a concical radiation lobe of half the angle having a width of $\theta$. Beyond fmax the amplitude of the spectrum becomes negligible.

The frequency fmin corresponds with the minimum range, thus with the altitude and the significant part of the spectrum is concentrated in a frequency band ranging from fmin to fmax, termed centre band which does not exceed 15% as a relative value in the practical case in which $\theta \simeq 30°$, that is to say:

$$\frac{fmax - fmin}{fmin} \simeq 0.15.$$

When the altimeter loop is in the lock-on search phase (when switched on, after an unlocking or during a sequential search cycle for verification of the integrity), the spectrum which may have been reflected by the ground scans the frequency axis by passing at the right of the reference frequency $f_0$. The contrast discriminator, centred at $f_0$, permanently compares the energy in a centre band window having the frequency $f_0$ with the out-of-band energy (one or two adjacent sideband windows), the frequency characteristic of the discriminator being arranged in a manner such that a flat white noise appreciably balances the weighing referenced C, the power received in the centre band window being counted positive and that received in the sideband windows being counted negative.

In the presence of the signal reflected by the ground, the spectrum of Fb is almost entirely contained in the centre band window, and the balance of the weighing exceeds a predetermined positive threshold $C_0$, which entails that the altimeter pursuit loop is maintained to be locked on to the ground.

For a volume-scattered echo of precipitation the form of the spectrum of Fb is different from that of the ground echo indicated above: the maximum of the spectrum always being adjusted substantially to the frequency $f_0$, part of the spectrum being situated in the sideband window of the lower frequencies, in the preferred case where there are two sideband windows, the envelope being a curve having steep positive slopes, and after passing the maximum in the centre band window, the envelope of the spectrum being subjected to slow decrease so that non-negligible powers are present in the whole sideband window of the higher frequencies and even beyond them if the depth of the volume of precipitation is sufficient, which is generally the case. Experinece and computations have shown that for echoes of considerable precipitation, the weighing effeted by the contrast discriminator may exceed the threshold $C_0$, thus authorising the locking on of the radio altimeter to a range situated inside the volume of precipitation. Such an erroneous locking on occurs when the following inequality is realised:

$$\int_0^\infty H(f) \, W_r(f) \, df \geq C_0(h)$$

$W_r(f)$: Spectrum of Fb (power), $H(f)$: Weighting function of the windows of the contrast discriminator, $C_0(h)$: Positive threshold as a function of the altitude shown according to an internal law of the system; this law reproduces approximately the theoretical space attenuation between the transmit aerial and the receive aerial after absorption and reflection by the ground which is nominally the least reflecting ($\sigma_0 \text{min} = -23$ dB).

Another factor presenting itself in the technical problem of a radio altimeter locking on to a VSE is the radiation law of the aerial (rolling diagram). Since this law is of the $\cos^n \theta$ type, the value of n conditions the influence of the rolling motion on the altitude measurement and also, as shown by the computation, the sensitivity to the locking on to precipitation.

In order to resolve the technical problem posed one has thought of optimising the contrast discriminator so that it can also perform, among other things, a discrimination of a volume-scattered echo for a given form of its spectrum that is sufficiently different from that of a ground echo. This optimisation is possible and permits a certain rejection of the VSE's for the value of $\theta$ exceeding 30°. However, the radiation angles of the aerials imposed on the radio altirmeters are typically comprised between 20° and 30° and the optimised contrast discriminator is thus not enough to sufficiently refect the VSE's, especially because of the very strong dynamics of the signals linked with the external parameters, that is to say, with the types of precipitation that can be expected. In effect, the reflection coefficient $\eta$ in $m^2/m^3$, that is to say, the surface equivalent radar (SER) per precipitation volume, expressed in dB (10 log.$\eta$) ranges from $-54$ dB for heavy rain (100 mm/h), to $-42$ dB for dry hail and $-32$ dB for wet hail, the latter representing the strongest type of precipitation.

SUMMARY OF THE INVENTION

According to the invention this problem is resolved and the prior-art disadvantages linked with the insufficiency of the contrast discriminator are mitigated due to the fact that the discriminating device mentioned in the first paragraph is characterised by the combination of a contrast discrimination set and a VSE discrimination set for detecting energy in a frequency band termed guard band situated at or beyond the upper end of the frequency bands of the contrast discrimination set, the latter comprising a contrast discriminator, an attenuator, and being arranged for controlling said pursuit validation circuit, and said VSE discrimination set being arranged for controlling the gain of said first attenuator.

The device according to the invention is based on the exploitation of the natural difference between the spectrums of the signals Fb due to the ground echo ( or a pinpoint target) and the spectrums due to the VSE as already indicated hereinbefore: the dispersion of the beat spectrum caused by a target which is extended in volume is revealed by a level, referenced D, of the signal appearing in an additional band, called guard band (or channel) centred on a frequency $f_1$ which is higher than $f_0$. If one expresses the radiation pattern of the radio altimeter aerial by a $\cos^n\theta$ law, where n is usually large with respect to 1, it can be demonstrated by means of computation that is a first aproximation the C/D ratio between contrast and dispersion levels diminishes in the proportion of $(f_0/f_1)^{2n+1}$ when one passes from a target which is homogeneously extended in surface to a target hemogeneously extended in volume. In addition, if the surface-extended target almost becomes a point, which is the case with proximity fuses, said reduction of the C/D ratio is even more distinct.

According to a preferred embodiment, the discriminator according to the invention is characterised in that said VSE discrimination set comprises a guard channel and a second attenuator including an automatic gain control for adjusting its output to a reference value $D_0$ and in that the first and second attenuators are identical and receive the same gain control signal.

When proceeding in this manner, the contrast signals C and dispersion signals D are separately transmitted to two identical amplifiers used as attenuators. The common gain control of the two amplifiers again makes a division between the levels of the signals C and D and again converts the magnitude C into the magnitude C' at the output of the first attenuator, so that:

$$C' = D_0 C/D$$

The threshold $D_0$ is adjusted so that:

$C' \geq C_0$ in the presence of a homogeneously surface-extended target.

Consequently, one will then have:

$C' << C_0$ in the presence of a volume-extended target.

Preferably, the guard band of the VSE discriminator is centred at the frequency $f_1$, of the order of 1.6 times the reference frequency $f_0$ and its bandwidth is of the order of 0.2 $f_0$.

The invention provides the following advantages and performances:

The reference to the ratio C/D and its use are not very sensitive to specifically the rolling motion of the aircraft support, nor to the statistical fluctuations of the precipitation to be expected and to the dynamics of the receiver.

The variation of the ratio C/D as a function of the altitude and taking into account the spectral degradation at low altitudes shows, when putting the decision threshold with respect to the variation of C/D at $+3$ dB, that:

for a $\cos^4\theta$ narrow radiation pattern, the useful range of the invention extends from 10 feet to 5000 feet for support variations of $\pm 30°$, and maximum precipitation ($\eta = -30$ dB), for a $\cos^{0.5}\theta$ wide radiation pattern, the useful range extends from 10 feet to 15000 feet for support variations of $\pm 60°$ (rolling) and maximum precipitation ($\eta = -30$ dB).

BRIEF DESCRIPTION OF THE DRAWING

The following description with respect to the annexed drawing drawing figures, all given by way of example, will make it better understood how the invention can be realised, in which.

DESCRIPTION OF THE PREFERRED EMBODIMENT

Figure 1:
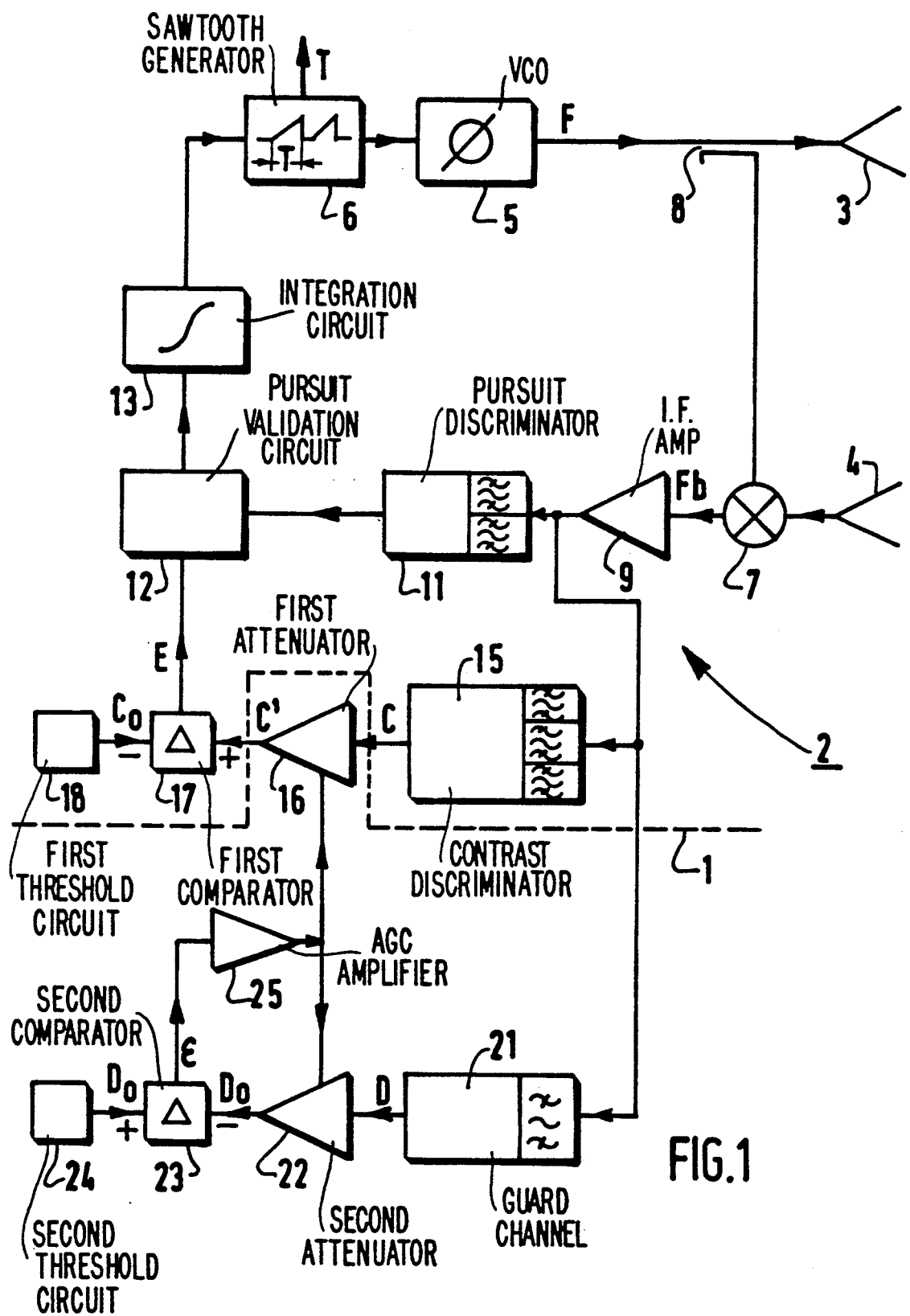
FIG. 1 is the block diagram of an FM/CW range measuring radar comprising a discrimination device according to the invention.

In FIG. 1 is represented above a broken line 1 a prior-art FM/CW range measuring radar referenced 2 in which a control loop maintains a constant best frequency between transmitted and received waves. This radar comprises a transmitting aerial 3 and a receive aerial 4. As regards the transmit section the radar 2 comprises a voltage controlled oscillator (VCO) 5 connected to the transmitting aerial 3, which oscillator transmits a radio frequency wave F and of which the input receives the output voltage signal from a sawtooth generator (STG) 6. The receive section is constituted by a signal processing chain comprising in a cascade configuration a mixer circuit 7, whose first of the two inputs is connected to the entrance of the receive aerial 4 and whose second input is connected to the output of the VCO 5 by means of a coupler 8, followed by an intermediate frequency amplifier 9, a pursuit discriminator 11, a pursuit validation circuit 12 and an integration circuit 13 whose output signal control the sawtooth generator 6.

When the radar 2 is in operation and an echo of the wave F transmitted at 3 is received by the receive aerial 4, a substrative beat signal Fb having the intermediate frequency fb appears at the output of the mixer 7. The frequency fb is equal to the frequency difference between the transmitted and received waves for the duration of the frequency slopes of these waves; this frequency fb is constant insofar as the slopes of the transmitted sawtooth are completely linear and the range (altitude) h searched for is derived from the classical equation:

$$h = \frac{C \cdot fb}{2\Delta F} T \qquad (1)$$

C: velocity of the electromagnetic wave in the air;
T: duration of the frequency slope of the transmitted sawtooth;
$\Delta F$: frequency swing of the constant sawtooth slope.

Figure 2A:
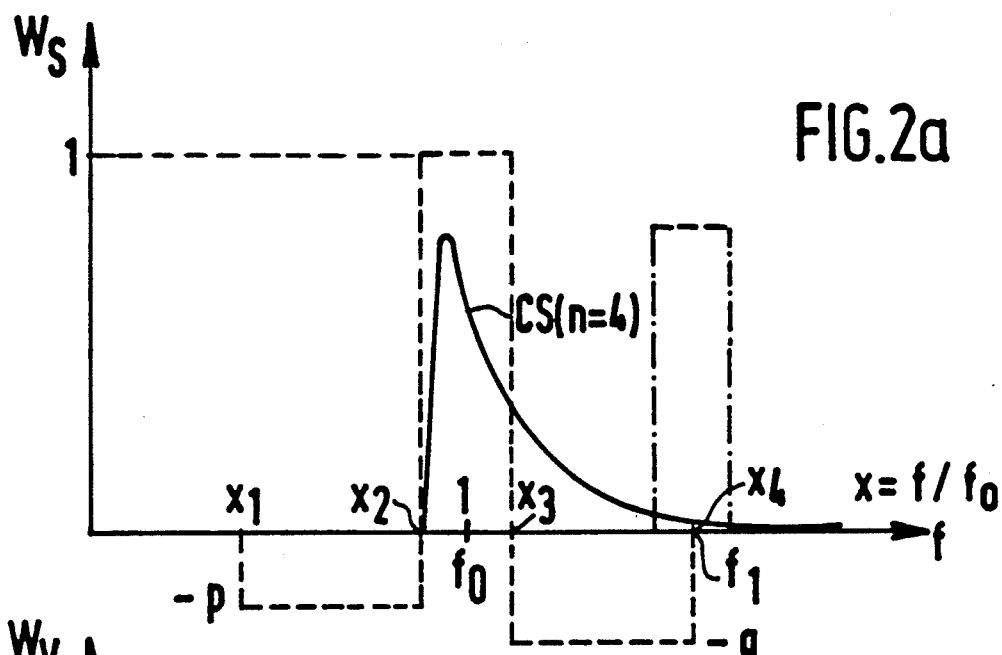
FIG. 2a and 2b represent the spectrums of the signal Fb due to the ground echo and the VSE respectively, as well as the windows of the passband of the contrast discriminator and the VSE discriminator.

The radar 2 is of the type controlling the steepness of the frequency slope in order to keep the value of frequency fb equal to a constant predetermined reference value $f_0$. The return path of this control is constituted by the elements 8, 7, 9, 11, 12 and 13 and in this path the pursuit discriminator 11, having two adjacent passbands symmetrical with $f_0$, ensures that fb is maintained at the reference value $f_0$; in these conditions, when the control loop is active, which implies the presence of an echo, the range of this echo is given to a nearest coefficient by measurement of the period T at the output of the STG 6. In order to attain the locking-on of the control loop, a preliminary systematic search phase is necessary. This search consists of assigning decreasing values (corresponding increasing values for T) to the steepness of the frequency slope by means of incrementation until a value fb near to $f_0$ is obtained, which causes the locking-on of the control loop and simultaneous abandonment of the search phase, the pursuit discriminator 11 being, for example, the one referenced 52 in above-mentioned French Patent Specification No. FR-A 1 557 670. In the case of a radio altimeter which is particularly intended, it is the ground echo which is searched for, this echo being identified by its power as a function of altitude (proportional to the duration of the frequency slope) and by the form of its spectrum. The expected power of the ground echo, largely variable as a function of altitude, is compared with a preset threshold $C_0$ which is a function of T, produced by an internal radar law and which follows as a first approximation the power variation of the minimum theoretical ground echo. In order to be recognised as such, this power is to be higher than the threshold $C_0$. On the other hand, a contrast discrimination set permits, in essence, to select among other things the spectrum form of the ground echo and consequently to validate or not validate the locking-on of the control loop. The envelope of the power spectrum of the ground echo is represented by the curve CS of FIG. 2a for which the aerial radiation pattern is: $\cos^n\theta = \cos^4\theta$. The contrast discrimination set is constituted, from the output of the amplifier 9 onwards, by a contract discriminator 15, a first attenuator 16 of which it is assumed for the moment in accordance with the prior art that the gain is fixed and equal to 1, and a first comparator 17 which receives at a second input the reference signal $C_0$ mentioned hereinbefore produced by a threshold circuit 18 and whose output signal E controls the pursuit validation circuit 12. The contrast discriminator 15 is, for example, of the type described at 44, 46, 48 in French Patent Specification No. FR-A 1 557 670; this contrast discriminator preferably comprises three adjacent passband filters as represented in broken lines in the FIGS. 2a and 2b. If the reduced abscissa: $x = f/f_0$ is considered, the left passband is comprised between the values $x_1$ and $x_2$ both smaller than 1 and the right passband between the values $x_3$ and $x_4$ greater than 1. The centre band is situated on either one of the two sides of the value 1 corresponding with the frequency $f_0$. Alternatively, the powers detected in each filter are weighted algebraically; for example, if the weight $+1$ is given to the central filter, the weights of the left and right filters are, for example, equal to: $-p = -0.2$ and $-q = -0.3$. The intended object for the weights associated with the bandwidths is that the balance of the powers detected by the contrast discriminator for a white noise is slightly negative so that a slightly negative signal (level) C is produced at the output of the discriminator 15. If the control loop locks on to a ground echo, the essence of the power of this echo is detected in the central filter where the maximum of the curve CS is found, substantially for the frequency $f_0$. There is no power whatsoever in the left filter and only a little power in the right filter. By integration of the curve CS and taking into account the weights of the filters, one obtains, when drawing up the balance of the powers counted positively and the powers counted negatively, a signal C depending both on the form of the spectrum and at the same time on the intensity of the signal reflected by the ground.

The level C is compared to the threshold $C_0$ in the comparator 17 which produces the difference: $E = C - C_0$. When, through the pursuit discriminator 11, the control loop has locked on and if after a short time interval the signal E is positive, the pursuit validation circuit 12 will keep the control loop in the locked-on state. If, alternatively, the signal E is negative, the circuit 12 will open the control loop. In the latter case the circuit 12 may also release an alarm and/or restart the cyclic ground-echo search phase. The contrast discrimination set, in cooperation with the pursuit validation circuit, thus enables to cancel the major part of the unwanted echoes other than the ground echoes. However, it may happen that either during the search phase or even when the control loop has locked on to the ground echo, a more powerful echo than this ground echo, owing to very heavy precipitation, that is to say, a volume-scattered echo (VSE) precedes the ground echo (surface echo) and causes the radio altimeter to lock on to the precipitation, which will render the altitude measurement (rounded off) altogether faulty.

Figure 2B:
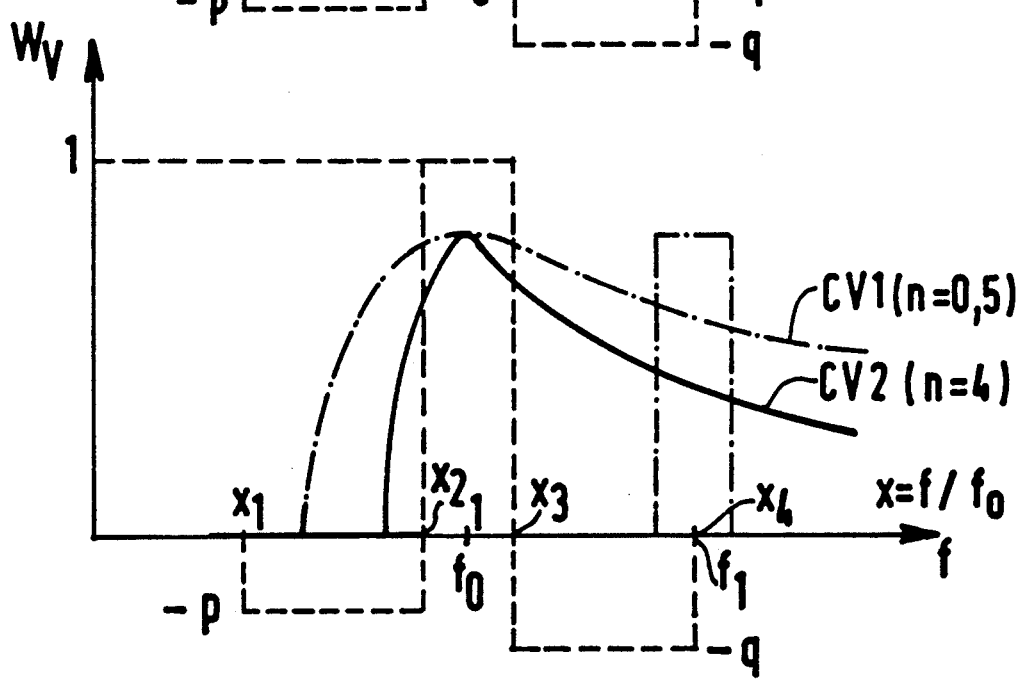

Two normalized power spectrum envelopes caused by a same VSE are represented in FIG. 2b. The dash-and-dot curve CV1 is the envelope which is obtained for a receive aerial having a wide rolling pattern of the type: $\cos^n\theta = \cos^{0.5}\theta$, that is to say, an aerial which is not very sensitive to the effects of rolling and the solid line curve CV2 corresponds with an aerial which presents a narrow rolling pattern of the type $\cos^n\theta = \cos^4\theta$. The intensity of the VSE may vary between very wide limits, whereas the contrast discrimination described hereinbefore becomes insufficient for any type of locking on to a VSE to be unequivocally prohibited. It is thus necessary to introduce a decision criterion based only on the form of the spectrum and not dependent on its intensity.

The invention consists of combining with the contrast discrimination set a VSE discrimination set shown underneath the line 1 of FIG. 1 and comprising, from the output of the amplifier 9, a guard channel 21 supplying a dispersion signal D, a second attenuator 22, a second comparator 23 receiving at a second additive input a fixed threshold signal $D_0$ coming from a second threshold circuit 24 and activating an automatic gain control amplifier 25, whereas the latter has its output connected to the gain control inputs of the identical attenuators 22 and 16. The guard channel (or dispersion channel) 21, consists of a single passband filter, called guard band filter having frequencies situated at the higher end of the frequency bands of the contrast discriminator and centred on the frequency $f_1$. The corresponding window is represented by the dash-and-dot curve patterns, FIGS. 2a and 2b. Actually, a large variation in the power levels of the signal Fb in the guard band may be observed depending on whether a ground echo or a VSE is concerned; the C/D ratio between contrast levels and dispersion levels varies (diminishes) approximately by $(f_0/f_1)^{2n+1}$ depending on whether a ground echo or a VSE is concerned. This creates a very good differentiation between the ground echoes and the VSE's for all possible values of the parameter n which identifies the aerial radiation; for example, for an aerial having a narrow radiation pattern (n=4) the C/D ratio may diminish by more than 20 dB when passing from an echo reflected by a planar surface (the ground) to an echo reflected by a scattering volume; with an aerial having a wide pattern (n=0.5), the C/D ratio again diminishes by approximately 8 dB when passing from the ground to a scattering volume. It will be observed that this C/D ratio is independent of the reflected levels because it is linked with the form of the spectrums and not with their intensity.

As regards the choice of the frequency $f_1$ it should be observed that the power level difference between $W_S$ and $W_V$ is accentuated when one deviates to the higher frequencies, which is favourable to a good discrimination; however, too hazardous assumptions need not be made concerning the depth of the layer of precipitation. A good compromise consists of centering the guard band on the value $f_1 \approx 1.6 f_0$ (x=1.6) and selecting a bandwith of the order of 0.2 $f_0$. For a value of $f_0$ equal to 25 kHz, the guard band is, for example, centred on $f_1 = 40$ kHz and comprised between 37.5 kHz and 42.5 kHz.

Having selected the variation criterion of the ratio C/D for the discrimination of the VSE's, a means preferably used for this purpose is the one represented by the arrangement of the elements 21 to 25 and 16 of FIG. 1, of which the operation is as follows:

Disregarding the powers of the unwanted echoes which may be recognised and eliminated by the single contrast discriminator, three power levels of a different nature may occur in the guard band:

the power P(V) of a possible volume echo, the power P(S) of the tail of the surface spectrum (of the ground) of the signal Fb which depends on the angular range of the radiation pattern and which is proportional to $\cos^n \theta$, the power P(B) of the internal thermal noise.

The threshold $D_0$ is chosen, by calibrating the VSE discrimination set so that it is substantially equal to the sum: P(S)+P(B) by choosing for P(S) the least reflecting ground echo for which the reflection coefficient in $m^2$ per $m^2$ is: $\sigma_0 \min = 0.005$ ($-23$ dB). In these calibration conditions the gain of the attenuators 22 and 16 is very near to 1 in the presence of a single surface echo, that is to say, without a VSE, and the contrast discrimination set operates as in the known prior art ($C' \simeq C$). When a VSE presents itself alone or superimposed on the surface echo in the VSE discriminator, the value D at the output of the latter is distinctly higher than the threshold value $D_0$ and the automatic gain control realised by the amplifier 25 operates in order to cause to occur at 22 an attenuation equal to $D_0/D$, whereas the level of the output signal of the differential mixer 23 always has to remain substantially zero. The same attenuation in the attenuator 16 adds to an output level C' of the latter so that:

$$C' = D_0 \, C/D.$$

With respect to this subject it will be observed that the attenuators 16 and 22 are chosen to be as identical as possible: these attenuators are, for example, two operational amplifiers presenting the same characteristic features.

The level C' which is of the order of 8 to 15 dB lower than the level C is thus in this case several orders lower than the threshold level $C_0$, which causes in the circuit 12 the inhibition of locking on to the VSE.

Summarizing, it will be observed that the meteorological precipitation forms a semi-infinite scattering volume which, on board a radio altimeter flying over the transition surface, gives rise to a discontinuous spectral signal which is analogous to the one reflected by the ground surface. Whereas the signals reflected by the ground diminish by 6 dB per altitude octave, the reflections by the volume scatterers diminish by only 3 dB per altitude octave relative to the transition surface, as a result of which there is a lock-on risk for altitudes which are lower according as the intensity of the precipitation is greater. In this respect the echo reflected by a thunderstorm having a rainfall of 100 mm/h is theoretically equivalent to the minimum echo threshold ($\sigma_0 = -23$ dB) seen at 4000 feet. Hail storms may produce much more intense echoes because of resonance phenomena inside the hail stones and the reflected levels may thus correspond with very low altitudes. It is possible, though, to attain a certain discrimination between the ground echo and echo from precipitation. Actually, a ground echo provides a compact support beat spectrum which is limited or at the very least very much attenuated by the opening of the aerial radiation pattern, whereas the beat spectrum of a volume echo is not limited towards enhancing frequencies. The prior-art contrast discriminator of a conventional FM/CW radio altimeter, balanced on the white noise by the allowance of a certain bandwidth and gain ratio, provides a differential margin of about 10 dB so that the critical altitude for a rainfall of 100 mm/h is shifted to 40000 feet. Still, less frequent but not exceptional hail storms may cause echoes that are 100 times more intense, reducing thus the critical altitude to 100 feet; in fact, the inevitable tolerances on the gain characteristic of the receiver largely absorb the margin indicated hereinbefore.

In order to effectively remove the doubt between a ground echo and an echo caused by precipitation, according to the invention a device set to a guard band is inserted in the receiver of the radio altimeter, which device analyses the altimeter beat spectrum (Fb) beyond the reference frequency $f_0$. The spectrum created by a surface echo is actually restricted by the aerial radiation pattern, whereas the volume echo is extended in depth, creating a spectrum which is slowly decreasing and independent of the aerial radiation pattern. It is shown that the ratio between the contrast level C and a guard level D obtained at about 0.7 octave upstream of $f_0$ varies unequivocally when passing from a ground echo to a volume echo and vice versa, and this for levels of very intense precipitation and in an extended range of altitudes; in practice, this range extends to 5000 feet for a radio altimeter having a narrow aerial radiation pattern and to 15000 feet for a radio altimeter having a wide pattern. This device according to the invention assumes a good linearity of the FM/CW modulation so that the useful spectrum remains very compact. Reading the signals reflected by the precipitation is facilitated by the large number of reflectors generally taken into accound and especially by the speed of the aircraft itself which causes a very fast wake. This echo discriminator is particularly effective when there is a cloud of particles which could then possibly be used as a counter-measure against low-altitude penetration missions.

The invention has been described above with reference to a two-aerial FM/CW radar; it could also be applied to a radar having a single transceiver aerial; in the latter case, however, the discrimination between the different echoes is harder to realise given the fact that the beat signal is affected by an unwanted strong signal due to the inevitable reflection of a large part of the send signal on the aerial owing to the standing wave ratio of this aerial.

In addition to radio altimeters, the invention also applies to proximity fuses of the FM/CW type for missiles. In this case, the values of the parameters to be considered are different from those linked with the use of a radio altimeter but perturbations due to precipitation or particles may occur and be avoided according to the invention. Particularly the ground echoes to be detected are of the pointy type and expected at a range of the order of 10 meters, the wavelengths used are short, of the order of 1 cm, so that they are more sensitive to volume-scattered echoes, the latter characteristic feature being only partly compensated by a radiation angle of the aerial beam which is much sharper (approximately 0.5 steradian instead of 1 or 2 steradians). In the case of proximity fuses, the knowing of volume-scattered false echoes helps to inhibit unwanted triggering of the fuse.

The implementation of this invention is particularly suitable for FM/CW radars in which the beat frequencies are adjusted around a reference value $f_0$ which virtually corresponds with the maximum of the spectrum; in effect, this permits to operate passband filters for the echo discrimination which filters have fixed values, shifted with respect to the reference value $f_0$.

It will be noted that the basic idea of the invention is also applicable to pulse radars which have, however, a more complex implementation. The spectral densities $W_S(x)$ and $W_V(x)$ in Watts/Hertz established for an FM/CW radio altimeter when there is ground or volume echo have in effect their dual counterparts for the pulse radar, which is the time-division density in Watts/second which is expressed in the same terms by replacing the reduced frequency-division variable $f/f_0$ by the time-division variable $x'=Ct/2h$, where t is the time passed since the send instant of the edge before the pulse having width $\delta$. The form of the pulses received after reflection either by a scattering surface or a scattering volume thus corresponds with the sampling of $W_S(x')$ or $W_V(x')$ through a window of width: $\Delta x' = c\delta/2h$. The received pulses take the form of the counterparts of the curves CS and CV of FIG. 2, the reduced abscissa x being replaced by the abscissa x'; the coincidence is better as long as $\Delta x'$ remains small with respect to 1. It will be observed in this context that the presence of the sampling window $\Delta x'$, whose width diminishes with the inverse of the altitude, is conducive to a space attenuation of 9 dB per altitude octave instead of 6 dB per octave for the FM/CW radio altimeters. The two types of modulation (FM/CW or pulse modulation) differ in their operating means to elaborate the contrast and the guard level. In the FM/CW mode having a controlled slope, the contrast and the guard level may be detected by means of fixed frequency filters sampling spectrums whose forms remain invariable as a function of the altitude, whereas in the case of fixed width pulse modulation (which is practically the only one possible) the form of the received pulses is enlarged in proportion to the altitude, which requires a time-division sampling in which the shift and the width of the window are variable.

What is claimed is:

1. A linearly frequency modulated continuous wave radar for measuring the range to a first object, said radar comprising:
   a. transmitting means for transmitting to the first object a wave having a frequency which periodically varies linearly;
   b. receiving means for receiving an echo of the transmitted wave from the first object;
   c. beat signal means coupled to the transmitting means and to the receiving means for producing from the transmitted wave and the echo wave a beat signal having a frequency fb;
   d. first discrimination means coupled to the beat signal means for producing a signal representing the comparability of the frequency fb with a reference frequency $f_o$;
   e. second discrimination means coupled to the beat signal means for producing a signal representing the comparability of an electrical characteristic of the beat signal with an electrical characteristic representative of the first object; and
   f. validation means coupled to the transmitting means and to the first and second discrimination means for controlling the frequency of the transmitted wave to maintain fb at $f_o$;
   characterized in that said second discrimination means comprises:
   (1) contrast discrimination means for detecting in the beat signal a first frequency spectrum representative of an echo from the first object and for producing a first signal representative of the energy of said detected spectrum;
   (2) volume scattered echo discrimination means for detecting in the beat signal an upper portion of a second frequency spectrum representative of an echo from a second object, said second spectrum resembling the first spectrum in the frequency range detected by the contrast discrimination means but being a substantially different in said upper portion, said volume scattered echo discrimination means including magnitude adjusting means coupled to the contrast discrimination means for attenuating the magnitude of the first signal upon detection of said upper portion of the second frequency spectrum.

2. A radar as in claim 1 where the volume scattered echo discrimination means comprises a guard channel for producing a second signal representative of the energy of the upper portion of the second frequency spectrum, and where the magnitude adjusting means comprises:

a. a first attenuator coupled to the contrast discrimination means for controllably attenuating the first signal;

b. a second attenuator coupled to the guard channel for controllably attenuating the second signal;

c. control means coupled to the first and second attenuators for effecting the same magnitude of attenuation by both of said attenuators, said control means controlling said attenuation such that the the second signal is attenuated to a reference magnitude $D_o$.

3. A radar as in claim 2 where the guard channel comprises a bandpass filter for passing a frequency band having a center frequency $f_1$ lying between 1.5 $f_o$ and 2 $f_o$ and having a bandwidth of approximately 0.2 $f_o$.

4. A radar as in claim 1, 2 or 3 for determining altitude above the first object.

5. A radar as in claim 1, 2 or 3 for determining proximity to the first object.

* * * * *